Patented July 19, 1949

2,476,668

UNITED STATES PATENT OFFICE 2,476,668

PRODUCTION OF DERIVATIVES OF BROMO ALIPHATIC ACIDS

Morris S. Kharasch, Chicago, Ill., and Elbert C. Ladd, Passaic, N. J., assignors to United States Rubber Company, New York, N. Y., a corporation of New Jersey No Drawing. Application April 12, 1947,
Serial No. 740,986

12 Claims. (Cl. 260—344)

This invention has to do with the production of derivatives of bromo aliphatic acids and more particularly with the preparation of alkyl esters of gamma bromo aliphatic acids which are convertible to gamma lactones by a novel process which comprises causing an alkyl ester of an alpha bromo aliphatic acid to react with an olefinically unsaturated organic compound so as to form a one-to-one adduct which is an alkyl ester of a gamma bromo aliphatic acid and is convertible to a gamma lactone. A further object of this invention is the preparation of gamma lactones by a novel process which comprises the steps of causing an alkyl ester of an alpha bromo aliphatic acid to react with an olefinically unsaturated organic compound so as to form a one-to-one adduct which is an alkyl ester of a gamma bromo aliphatic acid and subjecting said adduct to lactonizing conditions.

When a reaction mixture containing an alkyl ester of a alpha bromo acetic ester and an olefinic organic compound is heated in the presence of catalysts or catalytic agents which are known to generate or liberate free radicals such as diacyl peroxides there are formed one-to-one adducts of the alpha bromo aliphatic acid ester and the olefinic compound. By a one-to-one adduct is meant a compound containing in chemical combination the constituent elements from one molecule of the bromo aliphatic acid ester and the olefinic compound respectively. These one-to-one adducts are esters of gamma bromo organic acids.

The one-to-one adducts may be separated from the other components of the reaction mixture by known chemical methods such as, for example, by distillation at reduced pressure and may be subjected to lactonizing conditions and thus converted into gamma lactones. For instance, a one-to-one adduct formed by reacting under free radical reaction conditions may be heated with sufficient aqueous alkali for a time sufficient to bring about substantially complete hydrolysis of the adduct and the solution of the hydrolyzed adduct may be acidified and the water insoluble gamma lactone thus formed may be separated. When the adduct is an adduct of an alkene and an ethyl ester of an alpha bromo aliphatic acid, it may be converted into the desired gamma lactone merely by heating it at an elevated temperature and causing the elimination of ethyl bromide from the adduct.

This reaction whereby alkyl esters of alpha bromo aliphatic acids add to olefinic compounds so as to form one-to-one adducts which are alkyl esters of gamma bromo aliphatic acids is unique in that the analogous reaction does not take place with the corresponding esters of alpha chlor acids to form one-to-one adducts which are esters of gamma chlor acids. Esters of bromo aliphatic acids in which the bromine atom is on the beta carbon do not participate in the above reaction. Another peculiarity of this reaction lies in the fact that the alpha bromo aliphatic acids as distinct from their alkyl esters do not appear to participate in the reaction. Octene-1 and bromo acetic acid do not appear to form any one-to-one adduct when subjected to free radical reaction conditions which are sufficient to form substantial yields of the one-to-one adduct of octene-1 and an alkyl ester of bromo acetic acid.

The olefinic compounds which are reactive with the alkyl esters of alpha bromo aliphatic acids to form one-to-one adducts are in general those compounds which do not readily form high polymers when subjected to free radical reaction conditions. Such olefinic compounds are those having the type formula R—CH=CH—R' in which R is a substituted or unsubstituted aliphatic hydrocarbon radical which does not contain any double bonds conjugated with respect to the olefinic double bond. The radical R' may be either hydrogen or a methyl radical.

Among the olefinic compounds which have the structure R—CH=CHR' as defined and which are reactive with alkyl esters of alpha bromo aliphatic acids are the following:

Propene
Butene-1
Butene-2
Pentene-1
Hexene-1
Heptene-1
Octene-1
Nonene-1
Decene-1
Undecene-1
dodecene-1

Vinyl acetic acid esters
Undecylenic acid esters
Diallyl (hexadiene 1,-5)
Allyl acetate
Allyl chloride
Pentadiene 1,4
Dimethyl maleate
Dimethyl fumarate The alkyl esters of alpha bromo aliphatic acids which are reactive with olefinic compounds include those which are esters of dibasic as well as monobasic acids and may be generalized as having the formula

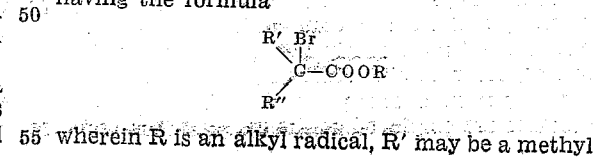

wherein R is an alkyl radical, R' may be a methyl group, a carbalkoxy group or hydrogen, R" may be hydrogen, or a substituted or unsubstituted hydrocarbon group.

Of the alkyl esters of alpha bromo aliphatic acids which are reactive under free radical reaction conditions with olefinic compounds to form one-to-one adducts, those which are free from branching of the carbon chain of the ester in the vicinity of the alpha position are preferred. In other words, the alkyl esters of alpha bromo normal aliphatic acids are preferred. Among these preferred bromo esters there may be used the alkyl esters of acids having the formula $$H(CH_2)_{n-1}-\overset{Br}{\underset{|}{C}}HCOOH$$

where $n$ can be any integer as, for example in:

Methyl bromo acetate
Ethyl bromo acetate
Propyl bromo acetate and other alkyl bromo acetates
Methyl alpha bromo propionate
Ethyl alpha bromo propionate
Propyl alpha bromo propionate and other alkyl bromo propionates
Methyl alpha bromo n butyrate
Ethyl alpha bromo n butyrate
Propyl alpha bromo n valerate or other alkyl alpha bromo n valerates
Methyl alpha bromo laurate
Ethyl alpha bromo laurate
Propyl alpha bromo laurate
Methyl alpha bromo stearate or other alkyl esters of alpha bromo stearic acid.

These esters may be generalized as having the type formula $$H(CH_2)_{n-1}CHBrCOO-(CH_2)_mH$$

where $n$ and $m$ can each be any integer.

Other alkyl esters of alpha bromo aliphatic acids which are reactive under free radical reaction conditions with olefinic compounds are the alkyl esters of mono bromo malonic acid. These esters form with olefinic compounds one-to-one adducts which are alkyl esters of beta carbalkoxy gamma bromo aliphatic acids.

Alkyl esters of other alpha bromo dibasic aliphatic acids than mono bromo malonic may be employed such as for example esters of alpha, alpha'-dibromo dibasic acids having the type formula $$ROOC-CHBr(CH_2)_n-CHBrCOOR$$

where $n$ is an integer. An example of such an ester is dimethyl alpha, alpha' dibrom adipate.

The reaction mixture employed in the present invention should preferably contain somewhat more than one molecular weight of the alpha bromo aliphatic ester for each molecular weight of the olefinic compound.

In practice, it is advantageous to employ reaction mixtures containing from one to twenty molecular weights of the bromo aliphatic ester for each molecular weight of the olefinic compound.

The aforementioned reaction mixture is caused to react by heating it in the presence of a substance which is capable of acting as a catalyst for ethylene polymerization but which is ineffective as a catalyst for the Friedel-Crafts reaction. Suitable catalysts are enumerated in U. S. P. 2,402,137. Of these catalysts the diacyl peroxides such as, for example, diacetyl peroxide and dibenzoyl peroxide are preferred. When diacyl peroxides are employed as the catalysts the temperature to which the reaction mixture is heated should be sufficient to decompose the peroxide. In general, temperatures between room temperature (20° C.) and about 150° C. are preferred.

The time during which the reaction mixture is heated with the diacyl peroxide is not critical but should be sufficient at the temperature employed to form an appreciable quantity of the desired adduct. When employing a diacyl peroxide as the catalytic agent or initiator in the temperature range between 20° C. and 150° C. periods of from 1 to 50 hours or more may be employed.

When a solution of one-fourth mole of octene-1 in one mole of ethyl bromoacetate is treated at 90° C. with five to ten mole per cent of diacetyl peroxide, a chain reaction is initiated. The main product is ethyl gamma-bromodecanoate. The course of the reaction may be summarized as follows:

$$CH_3-C\overset{O}{\underset{O}{\diagdown}}\!\!\!\diagup\overset{}{\underset{O}{\diagdown}}\!\!\!\diagup CH_3-C\overset{O}{\diagup} \longrightarrow CH_3\overset{O}{\overset{\|}{C}}-O\cdot + CH_3\cdot + CO_2 \quad (1)$$

$$CH_3\cdot + BrCH_2COOC_2H_5 \rightarrow CH_3Br + \cdot CH_2COOC_2H_5 \quad (2)$$

$$\cdot CH_2COOC_2H_5 + RCH=CH_2 \rightarrow RCHCH_2CH_2COOC_2H_5 \quad (3)$$

$$RCHCH_2CH_2COOC_2H_5 + BrCH_2COOC_2H_5 \longrightarrow$$
$$R\underset{\underset{Br}{|}}{C}HCH_2CH_2COOC_2H_5 + \cdot CH_2COOC_2H_5 \quad (4)$$

Steps (3) and (4) constitute a self-sustaining chain reaction.

The ethyl esters of bromoacetic, alpha-bromopropionic and alpha-bromo-n-butyric acids react with octene-1 under the above conditions to give the analogous gamma-bromoesters in yields of 60–75%. Branching of the carbon chain of the ester in the vicinity of the alpha-position (alpha-bromoisobutyrate and alpha-bromoisovalerate) results in a poor yield of addition product. When the bromine is removed to the beta-position, as in ethyl beta-bromopropionate, the compounds appear to be inert toward one another.

Styrene and ethyl acrylate when similarly reacted with alpha-bromoesters yield polymers whereas allyl chloride can be reacted to yield either 1:1 addition products, or products containing more than one unit of allyl chloride.

In Examples I to VII inclusive, all reactions of olefins with bromoesters are carried out in a similar manner. The reactants are kept at approximately 90° C. while a cool concentrated solution of diacetyl peroxide in the bromoester is slowly added. The reaction mixture is heated for one to two hours longer after the last of the peroxide has been added. A nitrogen atmosphere is maintained throughout.

EXAMPLE I

*Reaction of ethyl bromoacetate with octene-1*

A solution of 24.4 g. of octene-1 (0.244 mol) in 167 g. of ethyl bromoacetate (1.00 mol) is treated with 3.1 g. of diacetyl peroxide (0.0254 mol) over a period of ten hours. To isolate the addition product, the unreacted starting materials are removed by distillation at 20 mm. pressure. Distillation of the residue yields 37 g. of ethyl 3-bromodecanoate boiling at 93–94° C. (0.2 mm.), $N_D^{20}=1.4599$.

Anal. calcd. for $C_{12}H_{23}O_2Br$: Br, 28.67%, saponification equivalent, 139.5. Found: Br, 28.86%; saponification equivalent, 142.6.

EXAMPLE II

Reaction of ethyl alpha-bromopropionate with octene-1

A solution of 29.2 g. of octene-1 (0.265 mol) in 185 g. of ethyl alpha-bromopropionate (1.02 mol) is treated with 2.2 g. of diacetyl peroxide (0.019 mol) over a period of five hours. Distillation of the reaction mixture yields 59.6 g. of ethyl 3-bromo-1-methyl-decanoate boiling at 92° C. (0.1 mm.), $N_D^{20}=1.4570$.

Anal. calcd. for $C_{13}H_{25}O_2Br$: Br, 27.2%; saponification equivalent, 146.5. Found: Br, 26.92%; saponification equivalent, 148.2, 150.8.

EXAMPLE III

Reaction of ethyl alpha-bromo-n-butyrate with octene-1

A solution of 28.0 g. of octene-1 (0.25 mol) in 205 g. of ethyl alpha-bromo-n-butyrate (1.05 mol) is treated with 1.65 g. of diacetyl peroxide (0.014 mol) over a period of seven hours. Distillation of the reaction mixture yields 47.7 g. of ethyl 3-bromo-1-ethyl decanoate boiling at 108° C. (0.6 mm.), $n_D^{20}=1.4570$.

Anal. calcd. for $C_{14}H_{27}O_2Br$: Br, 26.02%; saponification equivalent, 153.5. Found: Br, 25.80%; saponification equivalent, 155, 150.

EXAMPLE IV

Reaction of propylene with ethyl bromoacetate

To 181 g. of ethyl bromoacetate (1.08 mol) which is kept saturated with propylene at 90° C. and 30 lb./in.², 1.8 g. of diacetyl peroxide (0.015 mol) is added over a period of five hours. Distillation of the residue left after recovering unchanged ethyl bromoacetate, yields 22 g. of ethyl gamma-bromo-n-valerate, boiling at 103–104° C. (22 mm.), $N_D^{20}=1.4553$. Reported, boiling at 105–107° C. (20 mm.) $N_D^{20}=1.4533$. (Boorman, Linstead and Rydon, JACS 575 (1933).)

Anal. calcd. for $C_7H_{13}O_2Br$: Br, 38.3%; saponification equivalent, 104.5. Found: Br, 38.23, 38.21%; saponification equivalent, 104, 105.

EXAMPLE V

Reaction of allyl chloride with ethyl alpha-bromo-propionate

A solution of 19.0 g. of allyl chloride (0.25 mol) in 196.3 g. of ethyl alpha-bromopropionate (1.085 mol) is treated with 2.6 g. of diacetyl peroxide (0.022 mol) over a period of eight hours. After recovery of the unreacted starting materials, distillation of the residue yields 17 g. of ethyl 4-bromo-5-chloro-2-methyl-n-valerate boiling at 97–102° C. (1 mm.).

Anal. calcd. for $C_8H_{14}O_2ClBr$: Halogen, 44.83%. Found: halogen, 44.83, 45.18%.

EXAMPLE VI

The reaction of propylene with ethyl alpha-bromopropionate in the presence of diacetyl peroxide To ethyl alpha-bromopropionate (109.65 gr.; 0.602 mole) shaken in a glass pressure apparatus at 90–96° C. with propylene (30–35 lbs./sq. in. pressure) a solution of diacetyl peroxide (2.9 gr.; 0.025 mole) in ethyl alpha-bromopropionate is added over a period of 5½ hours. Distillation of the residue left after recovering the unreacted ethyl alpha-bromopropionate yields ethyl gamma-bromo-alpha-methyl valerate (16.0 gr.; b. p. 82–84° C. at 9.5 mm.; $n_D^{20}=1.4580$).

Anal. calc'd. for $C_8H_{15}O_2Br$: Per cent Br, 35.8; saponification equivalent, 111.5. Found: Per cent Br, 32.16. Saponification equivalent, 112.2.

EXAMPLE VII

The reaction of butene-2 with ethyl bromoacetate in the presence of diacetyl peroxide A solution of diacetyl peroxide (3.45 gr.; 0.029 mole) in ethyl bromoacetate is added over a period of three hours to ethyl bromoacetate (134.9 gr.; 0.807 mole) saturated with butene-2 at 92° C. and a pressure of 30 lbs./sq. inch.

The reaction mixture is distilled directly. After unreacted ethyl bromoacetate has been removed, ethyl gamma-bromo-beta-methyl valerate (19.0 gr.; b. p. 70–71° C. at 4 mm.; $n_D^{20}=1.4588$) distilled.

Anal calc'd for $C_8H_{15}O_2Br$: Per cent Br, 3587. Saponification equivalent, 111.5. Found: Per cent Br, 35.25. Saponification equivalent, 112.2.

EXAMPLE VIII

A mixture containing the ethyl bromo acetate-propylene adduct from Example IV (10 gr.) potassium hydroxide (20 gr.) and water (30 cc.) is heated under reflux for five hours. During this period the reaction mixture becomes homogeneous. The solution is acidified with dilute hydrochloric acid, and the oil which separates is taken up in ether. The ether solution is washed with water and dried over anhydrous sodium sulfate.

The ether is removed from the extract and a colorless oil (4.0 gr.; B. P. 70° C. at 6 mm. $n_D^{20}=1.4328$) is distilled off. This oil is gamma valerolactone (80% yield).

EXAMPLE IX

The ethyl bromo acetate-octene-1 adduct from Example I (19 gr.) is heated for five hours at 50–55 mm. pressure in a 50 ml. flask fitted with a condenser. The volatile reaction product (ethyl bromide) is condensed in a trap cooled by liquid nitrogen.

The liquid remaining in the reaction flask after this treatment is distilled at reduced pressure and 9.6 gr. of gamma caprolactone (B. P. 93° C. at 0.2 mm.; $n_D^{20}=1.4495$) are obtained.

It has been found that the thermal reaction of ethyl gamma bromo esters to give ethyl bromide and a gamma lactone is a general reaction. Using this method, ethyl gamma bromo alpha methyl valerate and ethyl gamma bromo alpha, alpha-dimethyl caprate have also been converted to the corresponding gamma-lactones.

EXAMPLE X

Octene and diethyl alpha-bromomalonate

A mixture of 27.0 gms. of octene-1, 117 gms. of diethyl alpha-bromomalonate and 2.0 gms. of dibenzoyl peroxide is heated at 75–85° C. for four hours at which time 1.0 gm. of the peroxide is added. The reaction mixture is then heated for an additional 21.5 hours after which the unreacted starting materials are evaporated leaving a residue of 80.8 gms. which is substantially pure ethyl alpha carbethoxy gamma bromo decanoate.

Anal. found: C, 51.9%; H, 7.7%; Br, 21.9%. Theory, C, 51.2%; H, 7.8%; Br, 22.7%.

EXAMPLE XI

Allyl acetate and diethyl alpha-bromomalonate 239 grms. of diethyl alpha-bromo-malonate are heated at 75° C. for 66 hours during which time a mixture of 100 gms. of allyl acetate and 8 gms. of dibenzoyl peroxide is added in four equal portions at 0, 18, 25, and 42 hours. At the end of the reaction, the resulting mixture is evaporated to remove unreacted starting materials, yielding a residue of 70.0 gms. which is substantially pure ethyl alpha carbethoxy gamma bromo delta acetoxy valerate.

Anal. found, Br, 24.53%; theory, Br, 23.56%.

EXAMPLE XII

*Diallyl and ethyl alpha-bromobutyrate*

A mixture of 500 gms. of ethyl alpha-bromobutyrate, 25 gms. of hexediene-1,5 and 2.0 gms. of dibenzoyl peroxide is heated at 75–80° C. under a pressure of approximately 4 cm. of mercury for 18 hours at which time 25 gms. of hexediene-1,5 and 2.0 grams of the peroxide are added. The reaction is continued for 7 additional hours when 3.0 gms. of the peroxide are added and heating is then continued at 75–80° C. for 18 additional hours to complete the reaction. The reaction product is then cooled, washed with several portions of 5% aqueous sodium bicarbonate, dried and distilled. After evaporation of the unreacted starting materials, a residue of approximately 100 gms. is obtained which is substantially pure ethyl 2-ethyl-4-bromo-octene-7-oate (ethyl alpha ethyl gamma bromo omega vinyl hexanoate).

Anal. found, Br, 27.82%; theory, Br, 28.83%.

This one-to-one adduct can be converted by hydrolysis into the corresponding gamma lactone. By increasing the quantity of ethyl alpha bromo butyrate relative to the hexadiene and continuing the heating for a longer time, appreciable yields of a one-to-two adduct will be formed. This adduct contains in each molecule the elements from one molecule of hexadiene and the elements from two molecules of ethyl alpha bromo butyrate and is the diethyl ester of 4,7 dibromo 2,9 diethyl decanedioic acid. This adduct is convertible to the corresponding di gamma lactone.

The gamma bromo aliphatic acid esters and the gamma lactones made from them are useful chemicals and may be employed for example, as intermediates in the synthesis of dyes, pharmaceuticals and perfumes.

In view of the changes that may be made without departing from the spirit of the invention, reference is made to the appended claims for a delineation of the true scope of the invention.

Having thus described our invention, what we claim and desire to protect by Letters Patent is:

1. A process of producing derivatives of bromo aliphatic acids which comprises heating a reaction mixture containing as one reactive component an olefinically unsaturated organic compound of the formula R—CH=CH—R' wherein R is an organic radical which does not contain any double bonds conjugated with respect to the olefinic double bond, said compound being from the class consisting of olefinic hydrocarbons, olefinic halides, and olefinic carboxylic acid esters, and R' is a radical selected from the class consisting of the radicals hydrogen and methyl, containing as another reactive component an alkyl ester of an alpha bromo aliphatic acid and containing an amount of a diacyl peroxide effective to catalyze the reaction, the heating being carried out between 20° C. and about 150° C.

2. A process of producing alkyl esters of gamma bromo aliphatic acids which comprises heating a reaction mixture containing as one reactive component an unsaturated non-conjugated organic compound containing a terminal $$CH_2=CH—CH_2=group,$$

said compound being from the class consisting of olefinic hydrocarbons, olefinic halides, and olefinic carboxylic acid esters containing as another reactive component an alkyl ester of an alpha bromo aliphatic acid and containing an amount of a diacyl peroxide effective to catalyze the reaction, the heating being carried out between 20° C. and about 150° C.

3. A process as in claim 2 wherein the alkyl ester of an alpha-bromo aliphatic acid is an alkyl ester of an alpha-bromo normal aliphatic acid.

4. A process as in claim 2 wherein the alkyl ester of an alpha-bromo aliphatic acid is an alkyl ester of mono bromo malonic acid.

5. A process as in claim 3 wherein the alkyl ester of the alpha-bromo normal aliphatic acid is an ethyl ester.

6. A process of producing alkyl esters of gamma-bromo aliphatic acids which comprises heating a reaction mixture containing a non-conjugated alkene hydrocarbon, an alkyl ester of an alpha-bromo normal aliphatic acid and a diacyl peroxide, the heating being carried out between 20° C. and about 150° C..

7. A process of producing gamma-lactones which comprises the steps of reacting an alkyl ester of an alpha-bromo normal aliphatic acid with a non-conjugated alkene hydrocarbon so as to form a one-to-one adduct which is an alkyl ester of a gamma-bromo aliphatic acid, separating said adduct from the other components of the reaction mixture and converting said adduct to a gamma-lactone, the entire reaction being carried out between 20° C. and 150° C.

8. A process of producing lactones which comprises the steps of reacting an alkyl ester of an alpha-bromo normal aliphatic acid with a non-conjugated normal alkene hydrocarbon so as to form a one-to-one adduct which is an alkyl ester of a gamma-bromo aliphatic acid, separating said adduct from the other components of the reaction mixture, associating said adduct with an aqueous solution of a fixed alkali, heating this mixture for a time and at a temperature sufficient to effect substantially complete hydrolysis of said adduct, acidifying said mixture and separating the water insoluble gamma-lactone from the aqueous solution the entire reaction being carried out between 20° C. and about 150° C.

9. A process of producing gamma-lactones which comprises the steps of reacting an ethyl ester of an alpha-bromo normal aliphatic acid with a non-conjugated normal alkene hydrocarbon to form a one-to-one adduct which is an ethyl ester of a gamma-bromo aliphatic acid, separating said adduct from the other components of the reaction mixture, and heating said adduct at an elevated temperature for a time sufficient to cause substantial elimination of ethyl bromide from the adduct and the concurrent formation of a gamma-lactone the entire reaction being carried out between 20° C. and about 150° C.

10. The process of producing gamma-lactones which comprises heating between 20° C. and about 150° C. an ethyl ester of a gamma-bromo aliphatic acid and evolving ethyl bromide therefrom.

11. A process of producing derivatives of bromo aliphatic acids which comprises heating a reaction mixture containing as one reactive component an olefinically unsaturated organic compound of the formula R—CH=CH—R' wherein R is a hydrocarbon group devoid of double bonds conjugated with respect to the olefinic double bond shown, and R' is a radical selected from the class consisting of the radicals hydrogen and methyl, containing as another reactive component an alkyl ester of an alpha bromo aliphatic acid and containing an amount of a diacyl peroxide effective to catalyze the reaction.

12. A process of producing derivatives of bromo aliphatic acids which comprises heating a reaction mixture containing as one reactive component an olefinically unsaturated organic compound of the formula R—CH=CH—R' wherein R is a hydrocarbon group devoid of double bonds conjugated with respect to the olefinic double bond shown, and R' is a radical selected from the class consisting of the radicals hydrogen and methyl, containing as another reactive component an alkyl ester of an alpha bromo aliphatic acid of the formula

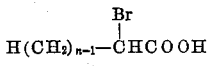

$$H(CH_2)_{n-1}-\overset{Br}{\underset{|}{C}}HCOOH$$

(where $n$ is an integer) and containing an amount of a diacyl peroxide effective to catalyze the reaction

MORRIS S. KHARASCH.
ELBERT C. LADD.

REFERENCES CITED

The following references are of record in the file of this patent:

UNITED STATES PATENTS

| Number | Name | Date |
|---|---|---|
| 2,093,695 | Larson | Sept. 21, 1937 |

Certificate of Correction

July 19, 1949

Patent No. 2,476,668   MORRIS S. KHARASCH ET AL.

It is hereby certified that error appears in the printed specification of the above numbered patent requiring correction as follows:

Column 8, line 4, claim 2, for that portion of the formula reading "=group" read —group;

and that the said Letters Patent should be read with this correction therein that the same may conform to the record of the case in the Patent Office.

Signed and sealed this 13th day of December, A. D. 1949.

[SEAL]

THOMAS F. MURPHY,
*Assistant Commissioner of Patents.*